United States Patent
Thirumalai et al.

(10) Patent No.: US 10,284,849 B2
(45) Date of Patent: May 7, 2019

(54) QUANTIZATION PARAMETER (QP) CALCULATION FOR DISPLAY STREAM COMPRESSION (DSC) BASED ON COMPLEXITY MEASURE

(71) Applicant: QUALCOMM Incorporated, San Diego, CA (US)

(72) Inventors: Vijayaraghavan Thirumalai, San Diego, CA (US); Natan Haim Jacobson, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 15/092,434

(22) Filed: Apr. 6, 2016

(65) Prior Publication Data

US 2016/0309149 A1    Oct. 20, 2016

Related U.S. Application Data

(60) Provisional application No. 62/146,902, filed on Apr. 13, 2015.

(51) Int. Cl.
    *H04N 19/14* (2014.01)
    *H04N 19/15* (2014.01)
    (Continued)

(52) U.S. Cl.
    CPC ......... *H04N 19/124* (2014.11); *H04N 19/129* (2014.11); *H04N 19/14* (2014.11);
    (Continued)

(58) Field of Classification Search
    CPC .... H04N 19/124; H04N 19/176; H04N 19/14; H04N 19/184
    See application file for complete search history.

(56) References Cited

U.S. PATENT DOCUMENTS 4,922,273 A * 5/1990 Yonekawa ........... H04N 19/176
                                                    375/E7.14
5,398,078 A    3/1995 Masuda et al.
(Continued)

FOREIGN PATENT DOCUMENTS

EP    2348734 A1    7/2011
JP    H05130433 A   5/1993
(Continued)

OTHER PUBLICATIONS

International Search Report and Written Opinion—PCT/US2016/026506—ISA/EPO—dated Jun. 23, 2016.
(Continued)

*Primary Examiner* — Obafemi O Sosanya
(74) *Attorney, Agent, or Firm* — Shumaker & Sieffert, P.A.

(57) ABSTRACT

Techniques for quantization parameter (QP) for display stream compression (DSC) based on complexity measure are disclosed. In one aspect, a method for determining a QP value includes determining a complexity value of a plurality of previous blocks and selecting a technique from a plurality of defined techniques for calculating a QP adjustment value for a current block based on the determined complexity value. The method may further include calculating the QP adjustment value for the current block via the selected technique and determining the QP value for the current block based on the QP adjustment value.

30 Claims, 7 Drawing Sheets

(51) Int. Cl.
*H04N 19/176* (2014.01)
*H04N 19/124* (2014.01)
*H04N 19/184* (2014.01)
*H04N 19/129* (2014.01)
*H04N 19/46* (2014.01)
*H04N 19/61* (2014.01)

(52) U.S. Cl.
CPC ......... *H04N 19/176* (2014.11); *H04N 19/184* (2014.11); *H04N 19/46* (2014.11); *H04N 19/61* (2014.11)

(56) References Cited

U.S. PATENT DOCUMENTS

| | | | |
|---|---|---|---|
| 5,933,451 | A | 8/1999 | Ozkan et al. |
| 7,039,108 | B2 | 5/2006 | Bauer et al. |
| 8,363,717 | B2 | 1/2013 | Togita et al. |
| 8,451,891 | B2 | 5/2013 | Seok et al. |
| 8,611,416 | B2 | 12/2013 | Hwang et al. |
| 8,787,445 | B2 | 7/2014 | Pore et al. |
| 8,848,801 | B2 | 9/2014 | Lainema et al. |
| 8,867,613 | B2 | 10/2014 | Joshi |
| 8,891,619 | B2 | 11/2014 | Leontaris et al. |
| 8,897,365 | B2 | 11/2014 | Reddy et al. |
| 9,071,822 | B2 | 6/2015 | Raveendran et al. |
| 9,241,159 | B2 | 1/2016 | Nakayama |
| 9,445,110 | B2 | 9/2016 | Leontaris et al. |
| 9,473,792 | B2 | 10/2016 | Srinivasamurthy et al. |
| 9,479,786 | B2 | 10/2016 | Lu et al. |
| 9,538,190 | B2 | 1/2017 | Karczewicz et al. |
| 9,565,440 | B2 | 2/2017 | Li et al. |
| 9,571,828 | B2 | 2/2017 | Okawa et al. |
| 9,628,816 | B2 | 4/2017 | Ugur et al. |
| 9,661,329 | B2 | 5/2017 | Zhang et al. |
| 2001/0017942 | A1 | 8/2001 | Kalevo et al. |
| 2002/0009146 | A1 | 1/2002 | Hall et al. |
| 2004/0146103 | A1 | 7/2004 | Chang et al. |
| 2006/0126728 | A1 | 6/2006 | Yu et al. |
| 2006/0133481 | A1 | 6/2006 | Chujoh |
| 2006/0165170 | A1 | 7/2006 | Kim et al. |
| 2006/0280242 | A1 | 12/2006 | Ugur |
| 2008/0031518 | A1* | 2/2008 | Song ............... H04N 19/176 382/166 |
| 2009/0046778 | A1 | 2/2009 | Lee et al. |
| 2011/0129162 | A1 | 6/2011 | Kim et al. |
| 2012/0026394 | A1* | 2/2012 | Maruyama ............ H04N 19/14 348/465 |
| 2012/0082243 | A1 | 4/2012 | Baylon et al. |
| 2012/0314764 | A1 | 12/2012 | Tidemann et al. |
| 2013/0170545 | A1 | 7/2013 | Okawa et al. |
| 2014/0169480 | A1 | 6/2014 | Lachine et al. |
| 2014/0301460 | A1 | 10/2014 | Karczewicz et al. |
| 2014/0376621 | A1 | 12/2014 | Fukushima et al. |
| 2015/0237346 | A1* | 8/2015 | Symes ............... H04N 19/15 375/240.03 |
| 2016/0301933 | A1 | 10/2016 | Jacobson |
| 2016/0301939 | A1 | 10/2016 | Thirumalai |
| 2016/0301950 | A1 | 10/2016 | Jacobson |

FOREIGN PATENT DOCUMENTS

| | | |
|---|---|---|
| JP | H05227525 A | 9/1993 |
| JP | H06245199 A | 9/1994 |
| JP | 2009177353 A | 8/2009 |
| JP | 2013138361 A | 7/2013 |
| KR | 20100035243 A | 4/2010 |
| KR | 20140109902 A | 9/2014 |
| WO | WO-199716029 A1 | 5/1997 |

OTHER PUBLICATIONS

VESA (Video Electronics Standards Association) "Display Stream Compression (DSC) Standard v1.1", VESA Standard, VESA, Us, vol. V1.1, Aug. 1, 2014 (Aug. 1, 2014), pp. 1-125, XP008177954, Retrieved from the Internet: URL: http://www.vesa.org/vesa-standards/standards-summaries.

Mohsenian N., et al., "Single-Pass Constant and Variable-Bit-Rate MPEG-2 Video Compression", IBM Journal of Research and Development, International Business Machines Corporation, New York, NY, US, vol. 43, No. 4, Jul. 1, 1999 (Jul. 1, 1999), pp. 489-509, XP002216512, ISSN: 0018-8646.

Vetro A., et al., "Object-based Transcoding for Scalable Quality of Service," Circuits and Systems, 2000, Proceedings. ISCAS 2000 Geneva, The 2000 IEEE International Symposium on May 28-31, 2000, Piscataway, NJ, USA,IEEE, May 28, 2000 (May 28, 2000), vol. 4, pp. 17-20, XP010503526, DOI: 10.1109/ISCAS.2000.858677 ISBN: 978-0-7803-5482-1.

Walls F., et al., "BDC-1: A Robust Algorithm for Display Stream Compression", 2013 Picture Coding Symposium (PCS), IEEE, Dec. 8, 2013 (Dec. 8, 2013), pp. 434-437, XP032567035, DOI: 10.1109/PCS.2013.6737776 [retrieved on Feb. 11, 2014].

Walls F., et al., "VESA Display Stream Compression", Mar. 3, 2014 (Mar. 3, 2014), pp. 1-5, XP002751573, Retrieved from the Internet: URL: <a href="http://www.vesa.org/wp-content/uploads/2014/04/VESA_DSC-ETP200.pdf">http://www.vesa.org/wp-content/uploads/2014/04/VESA_DSC-ETP200.pdf</a> on—Nov. 27, 2015].

International Preliminary Report on Patentability from International Application No. PCT/US2016/026506, The International Bureau of WIPO—Geneva, Switzerland, dated Jul. 21, 2017, 22 pp.

"ITU-T H.265, Series H: Audiovisual and Multimedia Systems, Infrastructure of audiovisual services—Coding of moving video, High efficiency video coding," The International Telecommunication Union, Apr. 2015, 634 pp.

Richardson; The H.264 Advanced Video Compression Standard; Wiley; 2010; 2nd Edition; (Chapter 3-9) (Year: 2010), pp. 1-349.

Second Written Opinion from International Application No. PCT/US2016/026506, The International Bureau of WIPO—Geneva, Switzerland, dated Mar. 14, 2017, 7 pp.

Response to Written Opinion dated Jun. 23, 2016, from International Application No. PCT/US2016/026506, dated Oct. 19, 2016, 11 pp.

* cited by examiner

US 10,284,849 B2

QUANTIZATION PARAMETER (QP) CALCULATION FOR DISPLAY STREAM COMPRESSION (DSC) BASED ON COMPLEXITY MEASURE

INCORPORATION BY REFERENCE TO PRIORITY APPLICATION(S)

This application claims the benefit of U.S. Provisional Application No. 62/146,902, filed Apr. 13, 2015.

TECHNICAL FIELD

This disclosure relates to the field of video coding and compression, and particularly, to video compression for transmission over display links, such as display stream compression (DSC).

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed display stream compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, a method includes determining a complexity value of a plurality of previous blocks; selecting a technique from a plurality of defined techniques for calculating a QP adjustment value for a current block based on the determined complexity value; calculating the QP adjustment value for the current block via the selected technique; and determining the QP value for the current block based on the QP adjustment value.

In another aspect, a device a memory configured to store: i) video data including a current block and a plurality of previous blocks, and ii) a plurality of defined techniques for calculating a QP adjustment value; and at least one processor circuit coupled to the memory and configured to: determine a complexity value of the previous blocks; selecting a technique from the defined techniques for calculating a QP adjustment value for a current block based on the determined complexity value; calculating the QP adjustment value for the current block via the selected technique; and determining the QP value for the current block based on the QP adjustment value.

In another aspect, an apparatus includes means for determining a complexity value of a plurality of previous blocks; means for selecting a technique from a plurality of defined techniques for calculating a QP adjustment value for a current block based on the determined complexity value; means for calculating the QP adjustment value for the current block via the selected technique; and means for determining the QP value for the current block based on the QP adjustment value.

In yet another aspect, a non-transitory computer readable storage medium has stored thereon instructions that, when executed, cause a processor of a device to determine a complexity value of a plurality of previous blocks; select a technique from a plurality of defined techniques for calculating a QP adjustment value for a current block based on the determined complexity value; calculate the QP adjustment value for the current block via the selected technique; and determine the QP value for the current block based on the QP adjustment value.

DETAILED DESCRIPTION

Figure 1A:
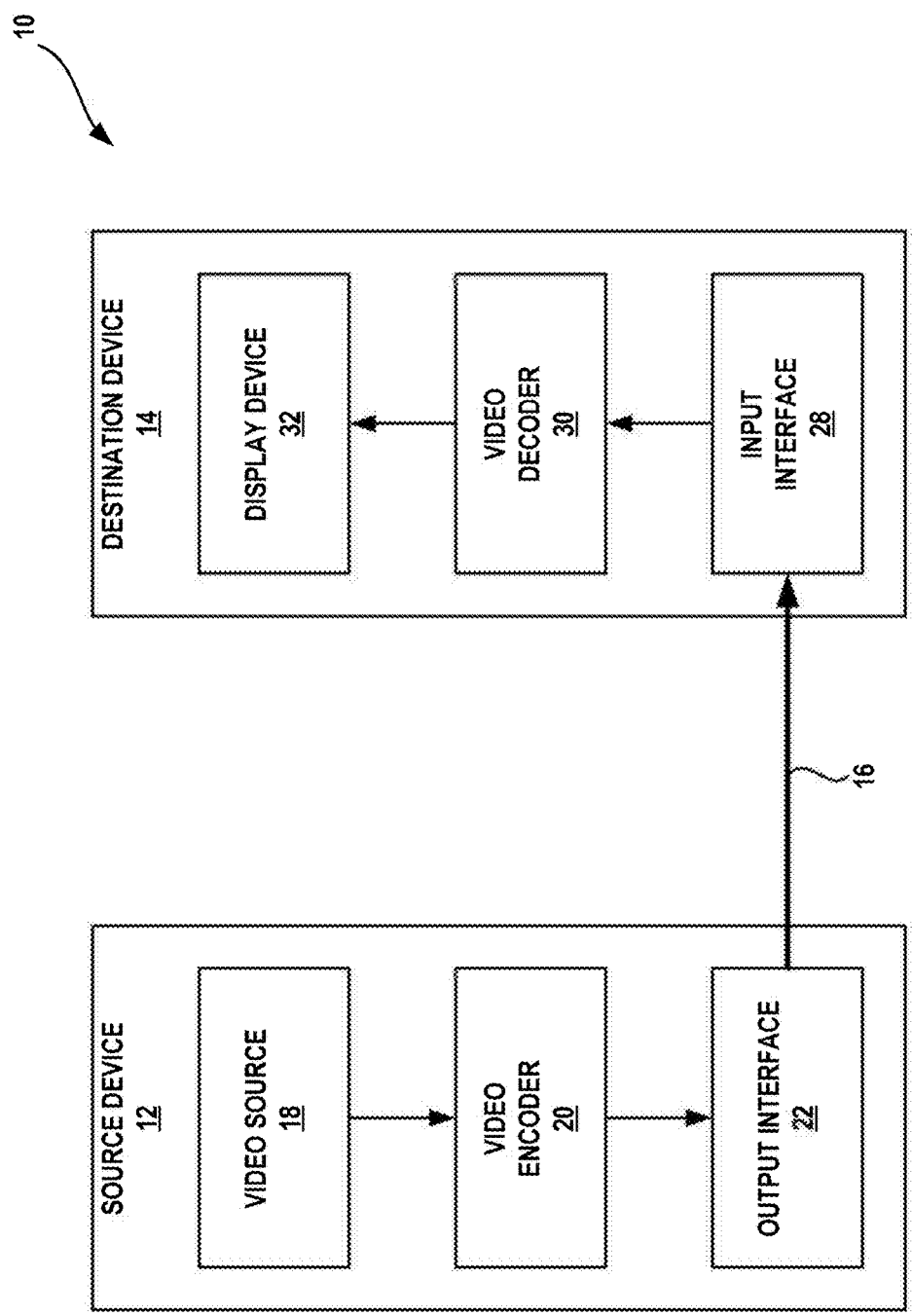
FIG. 1A is a block diagram illustrating an example video encoding and decoding system that may utilize techniques in accordance with aspects described in this disclosure.

In general, this disclosure relates to methods of improving video compression techniques such as display stream compression (DSC). More specifically, the present disclosure relates to systems and methods for improving the updating of a quantization parameter (QP) via the selection of an appropriate technique for calculating a QP adjustment value.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. The techniques described herein may be particularly applicable to standards which incorporate a constant bit rate (CBR) buffer model. Also, the techniques described in this disclosure may become part of standards developed in the future. In other words, the techniques described in this disclosure may be applicable to previously developed video coding standards, video coding standards currently under development, and forthcoming video coding standards.

Video coding methods may calculate a QP value by updating a previously calculated QP value with a QP adjustment value. The QP adjustment value may be calculated based on a difference between a previous block and a current block, e.g., a difference between the bits required to code the previous block and the target number of bits in which to code the current block.

However, the QP adjustment value which is determined by conventional techniques may result in coding inefficiencies or may cause noticeable artifacts under certain circumstances. For example, conventional techniques for determining the QP adjustment value may not be aggressive enough for transitions from flat to complex regions of an image (e.g., the QP adjustment value may be smaller than a more desirable QP adjustment value which would result in better coding efficiency without noticeable artifacts). The concepts of flat and complex regions will be described in greater detail below.

Additionally, when the fullness of the buffer is within a threshold value of being empty or full, the conventional techniques for calculating the QP adjustment value may be too aggressive, resulting in artifacts in an image reconstructed by a decoder. For example, a QP adjustment value calculated by the conventional techniques may be larger than a more desirable QP adjustment value which would mask artifacts from being noticeable in the reconstructed image.

Accordingly, aspects of this disclosure are directed to solving at least the above-indicated problems. In certain aspects, this may be accomplished via the detection or determination of conditions which may be associated with the above-indicated problems, and applying one or more alternative techniques for calculating a QP adjustment value under the detected conditions.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
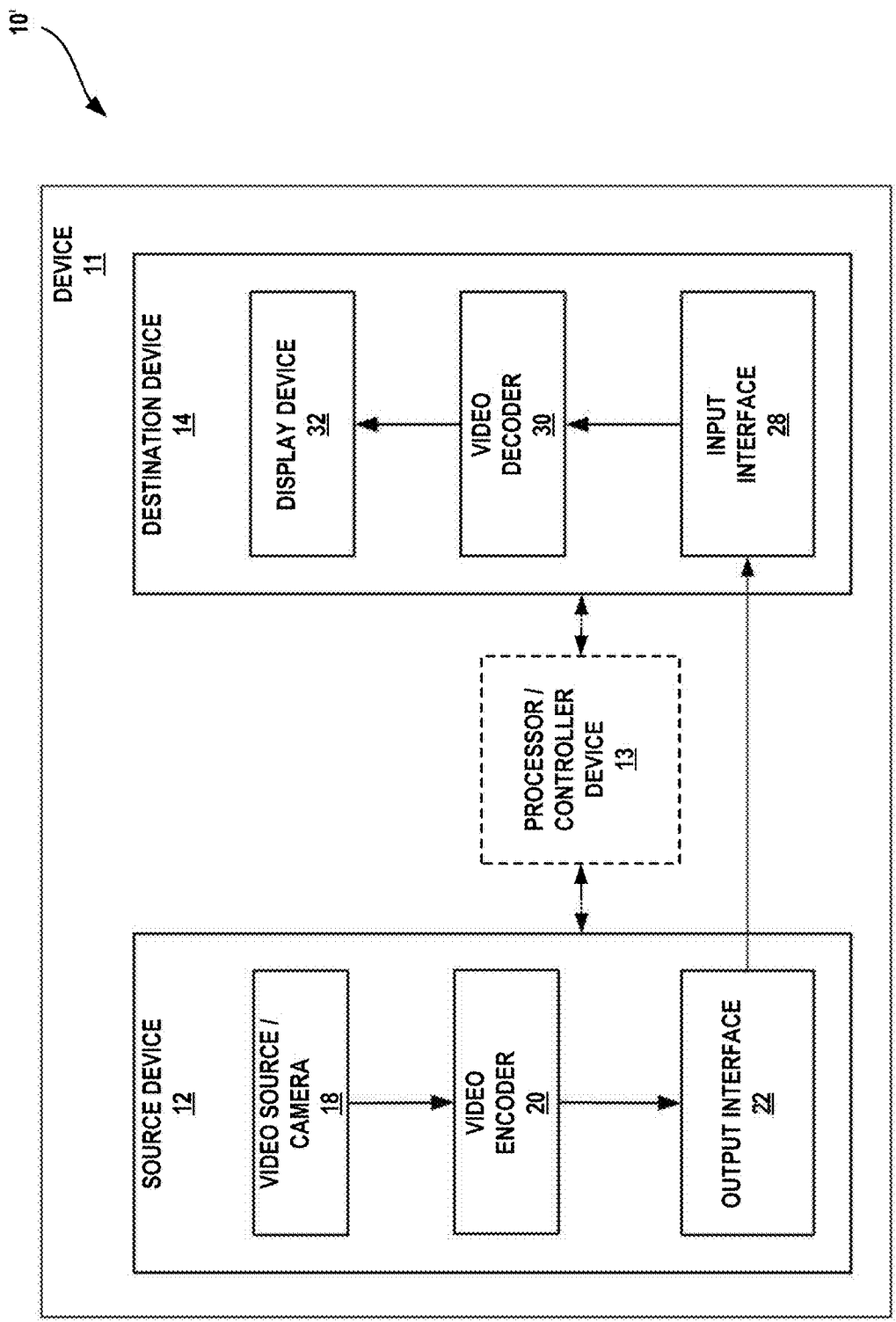
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, devices that are wearable (or removeably attachable) by (to) an entity (e.g., a human, an animal, and/or another controlled device) such as eyewear and/or a wearable computer, devices or apparatus that can be consumed, ingested, or placed within an entity, and/or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a QP. To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
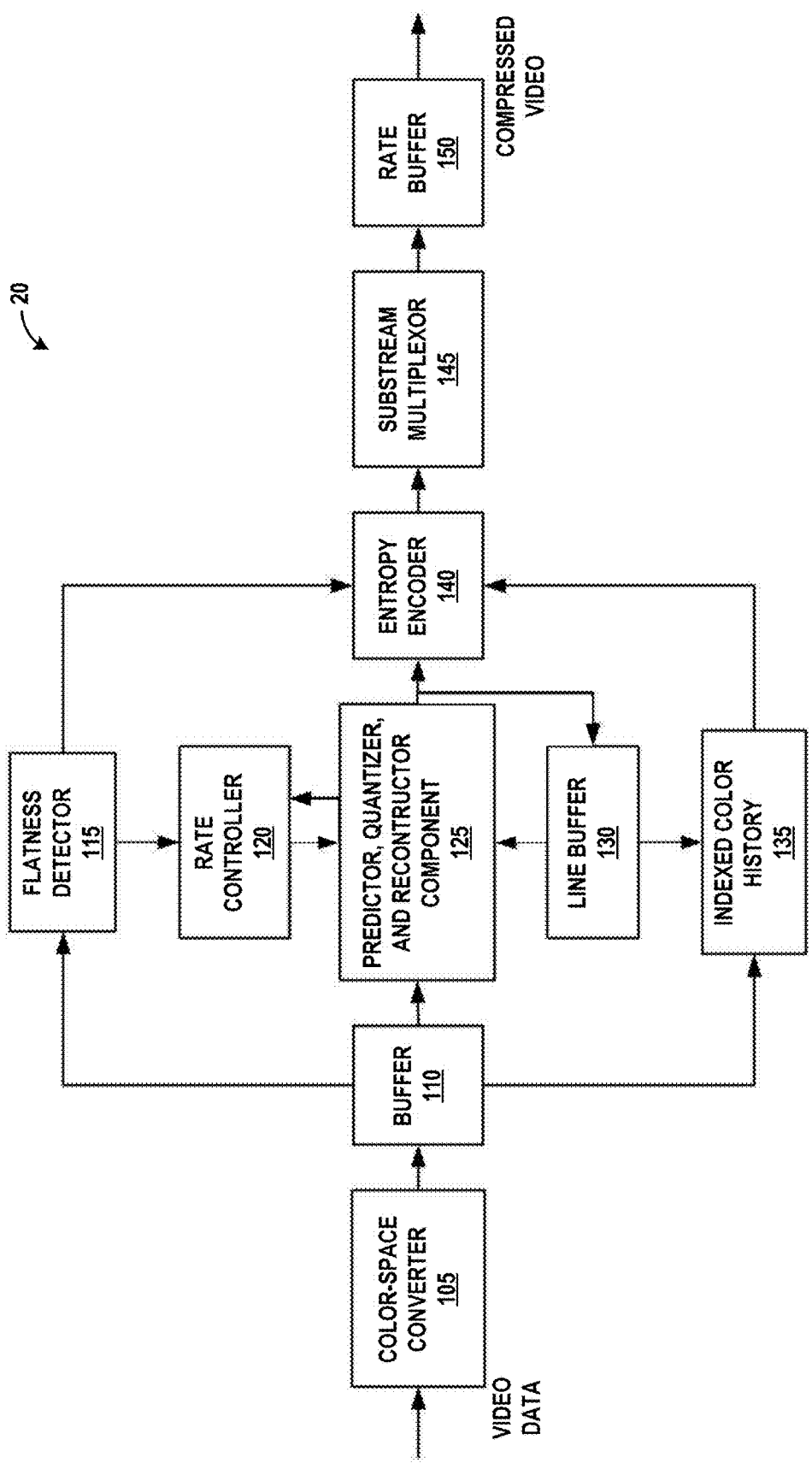
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space converter 105 may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a CBR buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

$$BF=((\text{BufferCurrentSize}*100)/\text{BufferMaxSize})$$

It is noted that the above approach to calculating BF is merely exemplary, and that the BF may be calculated in any number of different ways, depending on the particular implementation or context.

The flatness detector 115 can detect changes from complex (i.e., non-flat) areas in the video data to flat (i.e., simple or uniform) areas in the video data, and/or vice versa. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions from complex to flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified. Similarly, transitions from flat to complex regions may be used by the video encoder 20 to increase the QP in order to reduce the expected rate required to code a current block.

The rate controller 120 determines a set of coding parameters, e.g., a QP. The QP may be adjusted by the rate controller 120 based on the buffer fullness of the rate buffer 150 and image activity of the video data (e.g., a transition from complex to flat regions or vice versa) in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate. Thus, one purpose of the rate controller 120 is to determine a set of coding parameters, such as QP(s), coding mode(s), etc., to satisfy instantaneous and average constraints on rate while maximizing rate-distortion performance.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
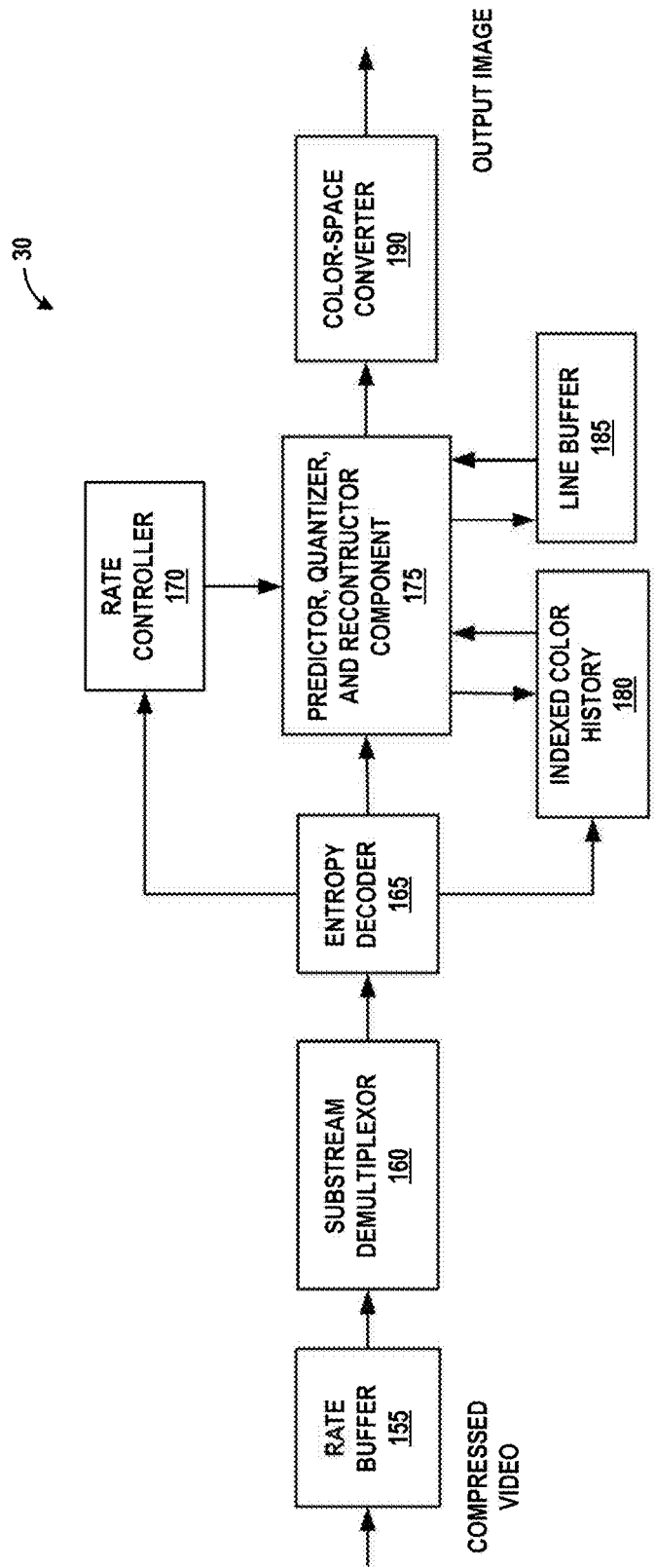
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

QP Calculation

In one approach, the QP for the current block (denoted as currQP) may be derived or calculated using the following equation:

$$\text{curr}QP = \text{prev}Q + Qp\text{Adj} * (\text{diffBits} > 0 ? 1 : -1),$$

where prevQP is the QP associated with the previous block, diffBits represents the difference between the previousBlockBits and targetBits, QpAdj is the QP offset value (e.g., QP adjustment value) that is calculated based on the magnitude of diffBits, previousBlockBits represents the number of bits used to code the previous block, and target-Bits represents a target number of bits allocated to code the current block. When previousBlockBits>targetBits, diffBits is positive, and the current block QP may be derived by adding the offset value QpAdj to the prevQP value. In other words, the QP value does not decrease in value from the prevQP value when diffBits is positive. When previousBlockBits≤targetBits, diffBits is negative or zero, and currQP does not increase from the prevQP value. It is noted that the offset value QpAdj may be calculated, for example, as a function of diffBits in such a way that QpAdj monotonically increases as the magnitude of diffBits increases.

Figure 3:
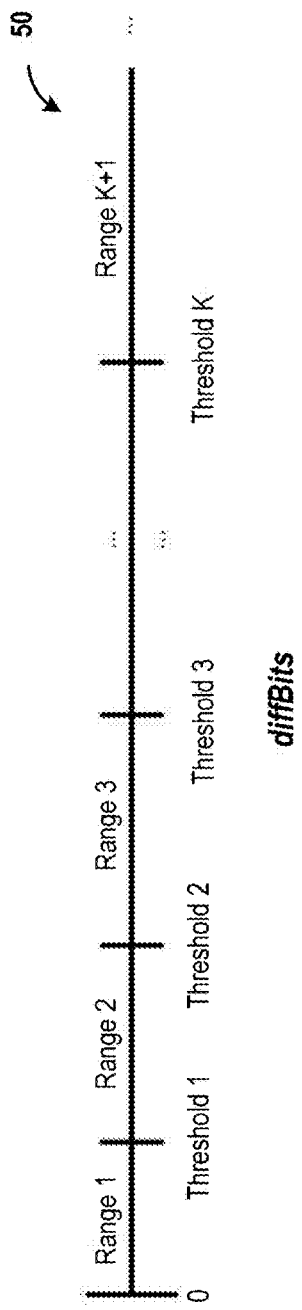
FIG. 3 shows an example approach to determining quantization parameter (QP) adjustment value(s).

One technique, referred to herein as a default technique, for calculating the QP adjustment value QpAdj will now be described with reference to FIG. 3. FIG. 3 provides a graph 50 including an axis on which values of diffBits starting at zero are plotted. In the default technique, when diffBits>0, diffBits may be classified into K+1 ranges using K threshold values. These threshold values are illustrated by the labels Threshold 1, Threshold 2, Threshold 3, . . . , and Threshold K and the ranges are illustrated by the labels Range 1, Range 2, Range 3, . . . , and Range K+1. In the default technique of FIG. 3, there is shown one approach to segmenting diffBits into K+1 ranges using K threshold values. Each range may be associated with a specific QpAdj value, where the QpAdj value increases as the range index increases. When diffBits≤0, the absolute value of diffBits may be classified into J+1 ranges using J threshold values (not illustrated), and there may be a specific QpAdj value assigned for each of the J+1 ranges.

In other aspects, the currQP value may be adjusted based on the fullness of the buffer (which may be represented in terms of buffer fullness BF), in order to prevent underflow and/or overflow of the buffer. In particular, when BF exceeds a certain threshold (e.g., $P_1$), currQP may be incremented by a fixed offset value (e.g., $p_1$). For example, currQP may be adjusted as follows: currQP+=$p_1$. Further, when BF falls below a certain threshold (e.g., $Q_1$), currQP may be decremented by $q_1$, e.g., currQP-=$q_1$. In certain aspect, a plurality of thresholds may be employed, and for each threshold there may be a corresponding offset value to adjust currQP.

Finally, when a transition from a complex region to a flat region is identified or when a flat region is identified, the currQP may be set to a low value (e.g., a value below a defined currQP value).

Flat to Complex Detection

Figure 4:
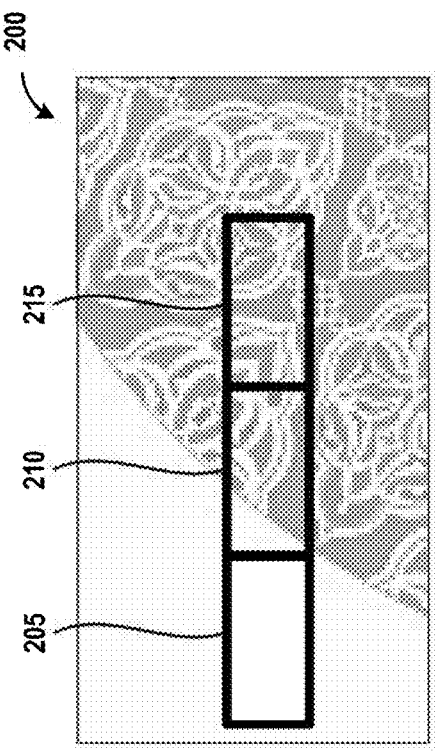
FIG. 4 illustrates an example transition from a flat region to a complex region within a picture.

With reference to FIG. 4, one or more techniques may be utilized to detect the transition from a flat/smooth region to a complex region for DSC. Regardless of which technique is used to detection a transition to a complex region, when such a transition is detected, the QP used may be increased (compared to the previous flat block) at the transition block in order to reduce the expected rate required to code the current block. It is noted, however, that the QP value at the transition block cannot be too high (e.g., exceeding a defined QP value), as the transition block contains both flat and complex regions.

FIG. 4 illustrates an example region of interest 200 which may be a frame or portion thereof, such as, for example, a slice of the frame. The region 200 may include and three successive blocks 205, 210, and 215. In this example, block 205 corresponds to a flat region/portion of the region 200, block 210 corresponds to a transition region/portion of the region 200, and block 215 corresponds to a complex region/portion of the region 200. As shown, the content of block 205 is flat, smooth, or uniform. The content of block 215 is textured and exhibits patterns that are not uniform throughout. The block 210 includes a transition from uniform to non-uniform content. A complexity calculation made be performed for each of the blocks 205, 210, and 215.

As described above under the section "QP Calculation", technique(s) may be implemented to calculate the QP based on the prevBlockBits which considers the local variations in the visual information. That is, while coding highly textured regions, the QP tends to increase and while coding smooth regions, the QP tends to decrease. Described below are QP calculation technique(s) that utilize the visual information present in future blocks which may be known or predicted.

Adjusting QP Based on Complexity of Visual Information in Future Blocks

The technique(s) described herein may be applied to any image or with a video coder that uses a rate control with a finite rate buffer.

In accordance with one or more aspects of the present disclosure, the QP may be adjusted by estimating the complexity of visual information present in future blocks, based on the visual information of blocks which have already been processed.

For instance, when the encoder 20 is currently encoding a high frequency/texture region and the encoder 20 predicts that the upcoming region is smooth, then the QP values for the highly complex region need not be increased aggressively.

The type of visual information in the future blocks (e.g., the complexity of the future blocks) may be estimated based on the visual information of the previously-encoded blocks.

The complexity of a block (or more generally a region of an image) may contain certain information that can be used by an encoder 20 or decoder 30 in coding the block/region.

In one example, a complexity value may be calculated by taking a frequency transform (e.g., discrete cosine transform (DCT), Hadamard transform, etc.) of a block and then summing the absolute value of all or some subset of the frequency transform coefficients. In one implementation, the direct current (DC, e.g., zero frequency) coefficient may be omitted from the calculation of the complexity value. In other implementations, one or more low frequency transform coefficients may be omitted in addition to omitting the DC coefficient. In some implementations, a color transformation may be applied to the block before applying the frequency transformation to the block.

In another example, a complexity value may be derived based on the number of bits used to code the block and the respective QP value of the block. In another example, the complexity value may be derived based on residual energy between the original block and the predicted block. The prediction may be done spatially from the neighboring reconstructed samples. Various other techniques for determining the complexity value, such as applying a color transformation before the frequency transform, may also be applied.

The complexity value of a block or blocks may be used to make various determining that affect the coding of the block and/or other blocks. For example, the complexity value of the previously-encoded blocks may be used for the estimation of the complexity of future blocks. In particular, when a future block is close to a previous block spatially (e.g., vertically adjacent), the complexity of the future block may be correlated to that of the previous block. Thus, certain aspects of this disclosure may leverage the correlation between the complexity of previous blocks in order to estimate the complexity of the future block(s). This estimation may be particularly desirable for video coding environments that have limited resources (e.g., processing power, memory size, etc.) such as in certain DSC coding environments.

Blocks may also be categorized based on comparing the block's complexity value to one or more thresholds. For example, when a block has a complexity value that is less than a flat complexity threshold, the block may be categorized as a "flat" block. Accordingly, the encoder 20 and/or decoder 30 may be configured to determine a QP value for blocks that are categorized as flat differently from blocks that are not categorized as flat (e.g., flat blocks may have lower QP values). However, depending on the implementation, the encoder 20 and/or decoder 30 may not be required to explicitly categorize blocks as flat or non-flat in order to determine a corresponding QP value.

In certain aspects, the encoder 20 and/or decoder 30 may select a specific technique (also referred to as an "alternative technique") to update the QP of a current block based on the derived complexity values (e.g., complexity values of previous blocks). In one example, a specific technique may be performed for every "N" blocks, where N is an integer. In one implementation, the specific technique may be selected for each line in a slice. For example, the QP technique for the current line may be determined based on at least some of the complexity values of the previous line.

Each technique used to update the QP may be different depending the type of visual information that has to be coded. For example, when all of the N blocks that have to be coded are highly textured then an alternative technique may be chosen to update the QP aggressively relative to the "default technique" (e.g., the technique described above in connection with FIG. 3). Alternatively, when a subset of blocks out of N are textured (e.g., the complexity of the subset of blocks is greater than a threshold value) and the remaining blocks are not complex (e.g., the complexity of the remaining blocks is less than a threshold value) or a first set of N blocks are textured and a next set of N blocks are not complex, then the encoder 20 and/or decoder 30 may select an alternative technique that is not very aggressive compared to the default technique when incrementing the QP value while coding the textured regions (e.g., the first set of N blocks). Alternatively, while coding flat regions, the encoder 20 and/or decoder 30 may select an alternative technique that is conservative in decreasing the QP relative to the default technique.

In one implementation, a specific QP technique may be determined from the previous line complexity value as described below. This technique will be described with the use of a number of variables which are defined below:

prevLineAvgComplexity is a variable that represents the average complexity value of the previous line. The complexity value may be derived via any of the above-described techniques.

numBlksSmallComplexity is a variable that represents the number of blocks in the previous line that are have a small complexity value. For example, blocks with a complexity value less than or equal to a certain threshold T, where T is a configurable parameter.

TotalNumBlksInPrevLine is a variable that represents the total number of blocks in the previous line.

percentageBlksSmallComplexity is a variable that represents the percentage of blocks having a small complexity value. In one implementation, percentageBlksSmallComplexity=(numBlksSmallComplexity/TotalNumBlksInPrevLine)*100.

Technique is a variable that represents the chosen technique to figure out the QP.

Accordingly, the following example pseudo code shown below in Table 1 may be used to select an alternative technique to be employed in calculating QP value(s) or QP adjustment value(s):

TABLE 1

Technique = default technique
If(prevLineAvgComplexity >= $T_1$)
{
    Technique = technique-$B_1$
}
else if(prevLineAvgComplexity >= $T_2$)
{
    Technique = technique-$B_2$
}
...
else if(prevLineAvgComplexity >= $T_n$)
{
    Technique = technique-$B_n$
}
if(prevLineAvgComplexity <= $P_1$ && percentageBlksSmallComplexity >= $Q_1$)
{
    Technique = technique-$A_1$
}
else if (prevLineAvgComplexity <= $P_2$ && percentageBlksSmallComplexity >= $Q_2$)
{
    Technique = technique-$A_2$
}
...
else if (prevLineAvgComplexity <= $P_m$ && percentageBlksSmallComplexity >= $Q_m$)
{
    Technique = technique-$A_m$
}

In the above pseudo code, [$T_1$, $T_2$, . . . , $T_n$], [$P_1$, $P_2$, . . . , $P_m$] and [$Q_1$, $Q_2$, . . . , $Q_m$] are the threshold values. technique-$B_1$, technique-$B_2$, . . . technique-$B_n$ are alternative techniques (also referred to as a set of second alternative techniques) which may be used when N blocks are determined to be complex or textured in general (e.g., the N blocks have an average complexity that is greater than or equal to at least one of the thresholds $T_1, T_2, \ldots, T_n$). technique-$A_1$, technique-$A_2$, ..., technique-$A_m$ are alternative techniques (also referred to as a set of first alternative techniques) which may be used when at least some of the blocks out of N are complex (e.g., the N blocks have an average complexity that is greater than or equal to at least one of $P_1, P_2, \ldots, P_m$) and the remaining blocks of the N blocks are not complex (e.g., the percentage of the N blocks that are small is greater than or equal to $Q_1, Q_2, \ldots, Q_m$ corresponding to the $P_1, P_2, \ldots, P_m$ threshold).

The number of alternative techniques from which an alternative technique may be chosen may depend on a complexity vs. performance tradeoff. For example, several degrees of complexity, such as moderately textured, very textured, extremely textured, etc. may be determined in order to classify the previous blocks. For each degree of complexity, there may be a corresponding technique to calculate the QP adjustment value.

In one implementation m=1. In another implementation n=2. In another implementation, one of the first alternative techniques is selected in place of the remaining first alternative techniques regardless of which of the thresholds-$A_1$, $[P_1, P_2, \ldots, P_m]$ and $[Q_1, Q_2, \ldots, Q_m]$ are met. For example, technique-$A_1$, may be selected even if any of the "$m^{th}$" condition(s) (e.g., prevLineAvgComplexity<=$P_m$ && percentageBlksSmallComplexity>=$Q_m$) are satisfied, e.g., instead of selecting technique-$A_m$, the technique involves using technique-$A_1$ 315. A similar technique may be applied, where technique-$B_1$ is selected regardless of which of the "$n^{th}$" condition(s) is (prevLineAvgComplexity>=$T_n$) is satisfied.

Figure 5:
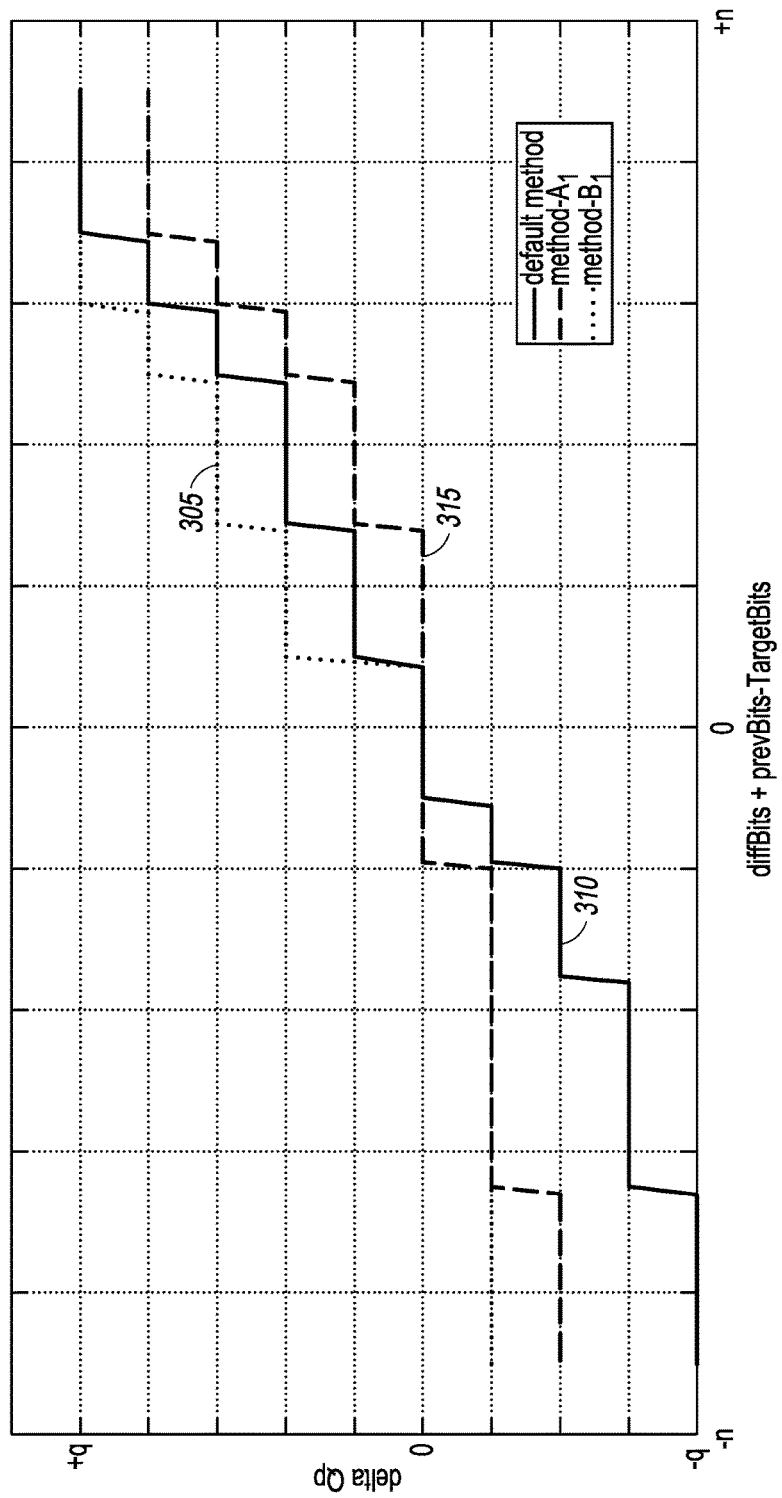
FIG. 5 shows an example approach to calculating a QP adjustment value.

One aspect of the relationship between the variable delta Qp (e.g., the QP adjustment value multiplied by 1 or −1 based on the value of diffBits) and the variable diffBits for the default technique and the alternative techniques: technique-$A_1$, technique-$A_2$, ... technique-$A_m$ will be described in connection with FIG. 5. The graph shown in FIG. 5 illustrates the default technique 310 along with the alternative techniques alternative techniques: technique-$A_1$ 315 and technique-$B_1$ 305. The variable diffBits is plotted on the x-axis and the variable delta Qp is plotted on the y-axis.

In the implementation of FIG. 5, the default technique may be represented based on the following equation:

delta $Qp=_{Qp}$Adj*(diffBits>0?1:−1)

When a subset of the blocks out of N are complex and the remaining are not complex (or) a first set of N blocks are complex and a subsequent set of N blocks are not complex, then delta Qp may be determined based on the alternative technique technique-$A_1$ 315. For example, in technique-$A_1$ 315 for a given value of diffBits>0, the value of delta Qp for technique-$A_1$ 315 is less than or equal to the corresponding delta Qp of default technique 310. That is, for complex or textured regions, QP is not increased aggressively when compared to the default technique 310. Thus, for technique-$A_1$ 315 the QP value for the complex or textured regions is less than or equal to a corresponding QP value calculated based on the default technique 310. However, when diffBits<=0 (e.g., for flat/smooth regions or non-textured regions), technique-$A_1$ 315 may determine the QP adjustment value such that QP decrement(s) may be performed conservatively, e.g., for a given value of diffBits, the absolute value of delta Qp (e.g., the QP adjustment value) for technique-$A_1$ 315 is less than or equal to a QP adjustment value calculated according to the default technique 310. Accordingly, for non-complex regions the QP value determined by the technique-$A_1$ 315 are greater than or equal to a corresponding QP value determined based on the default technique 310.

In one implementation, for values of diffBits>0, for a given value of diffBits, the delta Qp value for technique-$A_1$ 315<=the delta Qp value for technique-$A_2$<= ... the delta Qp value for technique-$A_m$<=the delta Qp value for the default technique 310. In one alternative, less than or equal to (<=) may be replaced by strictly less than (<).

In one implementation, when the same K threshold values are used to classify K+1 ranges as used in the default technique (as described above in connection with FIG. 3), for each range, the delta Qp value for technique-$A_1$ 315<=the delta Qp value for technique-$A_2$<= ... the delta Qp value for the technique-$A_m$<=delta Qp value for the default technique 310.

When the value of diffBits<=0, for a given value of diffBits, the absolute value of delta Qp (e.g., the QP adjustment value) for technique-$A_1$ 315<=the |delta Qp| value for technique-$A_2$<= ... the |delta Qp| value for technique-$A_m$<=the |delta Qp| value for the default technique 310. In one alternative, less than or equal to (<=) may be replaced by strictly less than (<). In one implementation, the default technique 310 may be used to calculate delta Qp for diffBits<=0, e.g., less than or equal to (<=) may be replaced by equal to (=).

In one implementation, when the same threshold J values are used to classify J+1 ranges as used in the default technique 310, for each range, the |delta Qp| for technique-$A_1$ 315<=the |delta Qp| value for technique-$A_2$<= ... the |delta Qp| value for technique-$A_m$<=the |delta Qp| value for the default technique 310.

One aspect of the relationship between the variable delta Qp (e.g., the QP adjustment value multiplied by 1 or −1 based on the value of diffBits) and the variable diffBits for the default technique, technique-$B_1$, technique-$B_2$, ... technique-$B_n$ will be described in connection with FIG. 5.

When N blocks to be coded are highly textured (have a complexity that is greater than a high complexity threshold), then delta Qp can be determined based on technique-$B_1$ 305, where for a given value of diffBits>0, the value of delta Qp for technique-B1 305 is greater than or equal to the corresponding delta Qp of the default technique 310. That is, for complex regions, QP is increased aggressively when compared to the default technique 310. When diffBits<=0, for a given value of diffBits, the value |delta Qp| (e.g., the QP adjustment value) for technique-B1 305 is less than or equal to a corresponding value determined via the default technique 310.

When the value of diffBits>0, for a given value of diffBits, the delta Qp value for technique-$B_1$ 305>=the delta Qp value for technique-$B_2$>= ... the delta Qp value for technique-$B_n$>=the delta Qp value for default technique 310. In one alternative, greater than or equal to (>=) may be replaced by strictly greater than (>). In one implementation, the default technique 310 may be used to calculate delta Qp for values of diffBIts>0, i.e., greater than or equal to (>=) may be replaced by equal to (=).

In one implementation, when the same K threshold are be used to classify K+1 ranges as used in the default technique (as described above in connection with FIG. 3), for each range, the delta Qp value for technique-$B_1$ 305>=the delta Qp value for technique-$B_2$>= ... the delta Qp value for technique-$B_n$>=the delta Qp value for the default technique 310.

When diffBits<=0, for a given value of diffBits, the |delta Qp| value for technique-$B_1$ 305<=the |delta Qp| value for technique-$B_2$<= ... the |delta Qp| value for technique-$B_n$<=the |delta Qp| value the for default technique 310. In one alternative, less than or equal to (<=) may be replaced by strictly less than (<). In one implementation, the default technique 310 may be used to calculate the value delta Qp for diffBits<=0, e.g., less than or equal to (<=) may be replaced by equal to (=).

In one implementation, when the same threshold J values are used to classify J+1 ranges as used in the default technique 310, for each range, the |delta Qp| value for technique-$B_1$ 305<=the |delta Qp| value for technique-$B_2$<= ... the |delta Qp| value for technique-$B_n$<=the |delta Qp| value for the default technique 310.

It is to noted that the example approach of FIG. 5 is for illustration purposes and that the actual function or relationship between diffBits vs. delta Qp for each technique may be different depending on the particular implementation or context.

In one implementation, for the technique(s) described above, the determined delta Qp values for diffBits<=0 may be exactly the same as that of used in default technique, e.g., unchanged compared to the default technique 310. However, for diffBits>0, delta Qp may be determined as explained above.

The techniques described herein may be applied for (1) explicit QP derivation and/or (2) implicit QP derivation. In explicit QP derivation, the QP value may be derived at the encoder 20. In implicit QP derivation, both the encoder 20 and decoder 30 may derive the QP value. However, the decoder 30 may utilize additional information to derive the QP value, such as, for example, the type of QP technique or the specific alternative technique used to determine the QP value. However, the decoder 30 may utilize additional information to derive the QP, such as, for example, the type of QP technique, which may be signaled in the bitstream by the encoder 20. Other information that can be used to assist the decoder 30 in deriving the QP value may be signaled in the bitstream by the encoder 20 depending on the implementation.

In a first example, the techniques proposed herein may be used by the encoder 20 to calculate the QP by choosing an appropriate QP adaptation curve. The encoder 20 may explicitly signal the QP, for example, via signaling the differences between the current and previous block QPs. The encoder 20 may also signal the chosen QP adaptation curve.

In a second example, the techniques proposed herein may be used by both the encoder 20 and the decoder 30. The type of QP adaptation curve may be chosen by the encoder 20 and may be explicitly signaled. However, the decoder 30 may require additional information to derive the QP. For example, type of QP adaptation curve and/or the specific technique may be still chosen by the encoder 20 and may be explicitly signaled. The encoder 20 may, for example, signal the chosen selected QP technique for every "N" blocks.

In another implementation, the type of QP technique may not be signaled. That is, both the encoder 20 and the decoder 30 may derive the QP technique using the information from the already coded blocks.

Example Flowcharts for Determining Quantization Parameter (QP) Value

Figure 6:
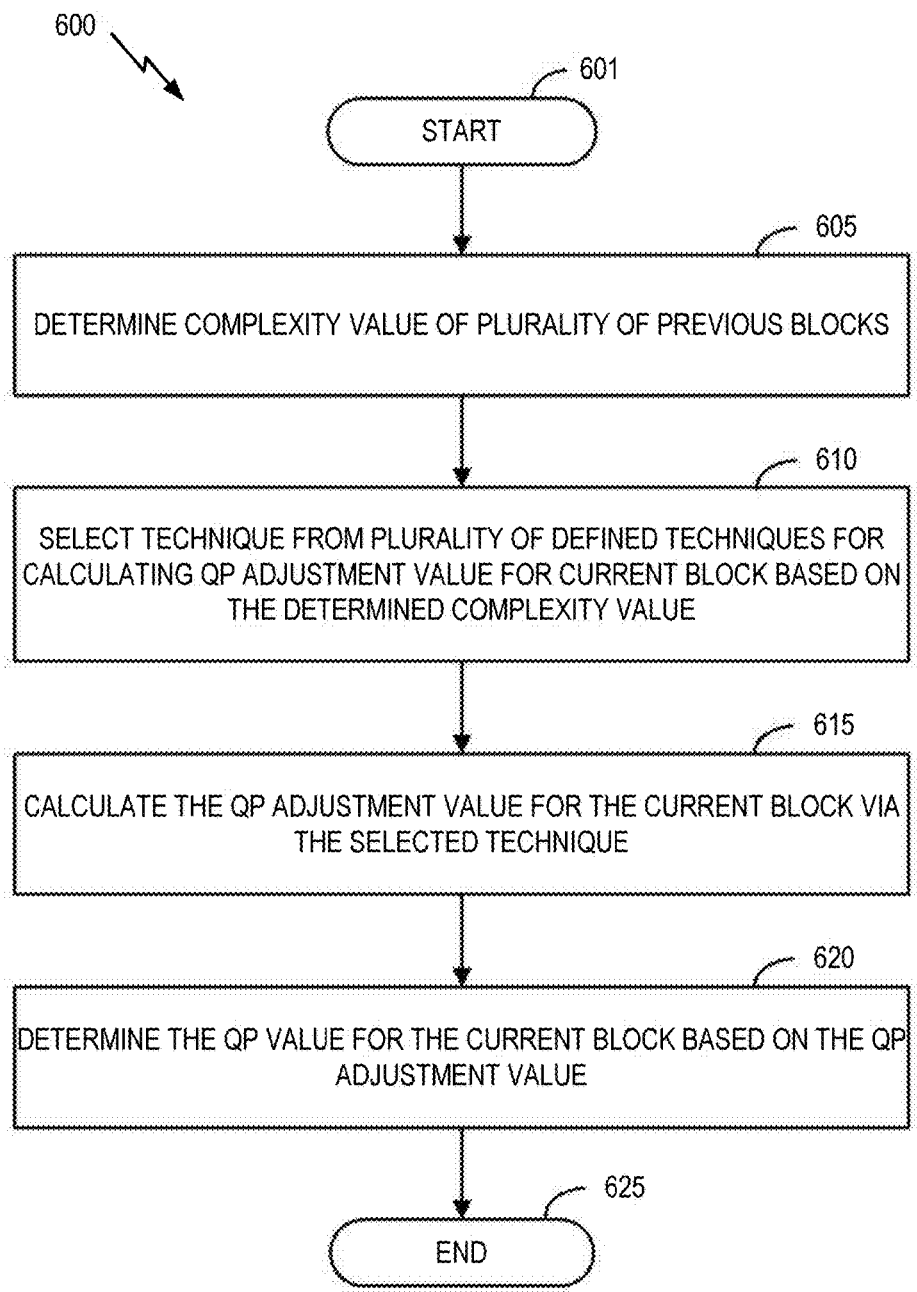
FIG. 6 is a flowchart illustrating a method for calculating a QP adjustment value in accordance with aspects described in this disclosure.

With reference to FIG. 6, an example procedure for determining a QP value will be described. FIG. 6 is a flowchart illustrating a method 600 for coding video data, according to an embodiment of the present disclosure. The steps illustrated in FIG. 6 may be performed by a video encoder (e.g., the video encoder 20 in FIG. 2A), a video decoder (e.g., the video decoder 30 in FIG. 2B), or component(s) thereof. For convenience, method 600 is described as performed by a video coder (also simply referred to as coder), which may be the video encoder 20, the video decoder 30, or another component.

The method 600 begins at block 601. At block 605, the coder determines a complexity value of a plurality of previous blocks. In certain implementations, the coder may determine a complexity value for each of the previous blocks via performing a frequency transformation. At block 610, the coder selects a technique from a plurality of defined techniques for calculating a QP adjustment value for a current block based on the determined complexity value.

At block 615, the coder calculates the QP adjustment value for the current block via the selected technique. At block 620, the coder determines the QP value for the current block based on the QP adjustment value. The method ends at block 625.

In the method 600, one or more of the blocks shown in FIG. 6 may be removed (e.g., not performed) and/or the order in which the method is performed may be switched. In some embodiments, additional blocks may be added to the method 600. The embodiments of the present disclosure are not limited to or by the example shown in FIG. 6, and other variations may be implemented without departing from the spirit of this disclosure.

Other Considerations

It should be noted that aspects of this disclosure have been described from the perspective of an encoder, such as the video encoder 20 in FIG. 2A. However, those skilled in the art will appreciate that the reverse operations to those described above may be applied to decode the generated bitstream by, for example, the video decoder 30 in FIG. 2B.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including applications in wireless communication device handsets, automotive, appliances, wearables, and/or other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method for determining a quantization parameter (QP) value, comprising:
    determining a complexity value of a plurality of previous blocks;
    determining a comparison of (a) the number of the previous blocks having a complexity value that is less than a lower complexity threshold to (b) the total number of the previous blocks;
    selecting a technique from a plurality of defined techniques for calculating a QP adjustment value for a current block based on the determined complexity value and the comparison;
    calculating the QP adjustment value for the current block via the selected technique; and
    determining the QP value for the current block based on the QP adjustment value.

2. The method of claim 1, further comprising:
    determining an average complexity value of the previous blocks;
    determining whether the average complexity value of the previous blocks is greater than or equal to an upper average complexity threshold,
    wherein the selection of the technique is further based on the determination of whether the average complexity value of the previous blocks is greater than or equal to the upper average complexity threshold.

3. The method of claim 2, further comprising:
    determining a difference in the number of bits required to code the previous block and a target number of bits for the current block,
    wherein in response to i) the difference in the number of bits being greater than zero and ii) determining that the average complexity value of the previous blocks is greater than or equal to the upper average complexity threshold, the QP adjustment value calculated via the selected technique is greater than or equal to a QP adjustment value calculated via a default technique selected in response to i) the difference in the number of bits not being greater than zero or ii) determining that the average complexity value of the previous blocks is not greater than or equal to the upper average complexity threshold.

4. The method of claim 3, wherein for a negative or zero difference, an absolute value of the QP adjustment value calculated by the selected technique is less than or equal to an absolute value of a QP adjustment value calculated by the default technique.

5. The method of claim 1, further comprising:
    determining an average complexity value of the previous blocks;
    determining whether the average complexity value of the previous blocks is less than or equal to a lower average complexity threshold; and
    determining whether the comparison is greater than or equal to a comparison threshold,
    wherein the selecting of the technique is further based on (i) the determination of whether the average complexity value of the previous blocks is less than or equal to the lower average complexity threshold, and (ii) the determination of whether the comparison is greater than or equal to the comparison threshold.

6. The method of claim 5, wherein an absolute value of the QP adjustment value calculated via the selected technique is less than or equal to an absolute value of a QP adjustment value calculated by a default technique for a given difference in the number of bits required to code the previous block and a target number of bits for the current block, wherein the default technique is selected in response to (i) the average complexity value of the previous blocks being greater than the lower average complexity threshold, or (ii) the comparison being less than the comparison threshold.

7. The method of claim 1, wherein the selecting of the technique comprising selecting a technique for a current line, wherein the method further comprises calculating the QP adjustment value for each of the blocks in the current line via the selected technique for the current line.

8. The method of claim 7, wherein the selected technique for the current line is explicitly signaled in a bitstream.

9. The method of claim 1, wherein the determination of the complexity value of the previous blocks is based on a number of bits used to code the previous blocks and QP values for the previous blocks.

10. The method of claim 1, wherein the calculating of the complexity value of the previous blocks comprises:
   determining a plurality of transform coefficients via taking a transform of the previous blocks; and
   summing the absolute values of the transform coefficients.

11. The method of claim 10, wherein the sum of the absolute values of the transform coefficients excludes a DC value transform coefficient.

12. The method of claim 10, further comprising applying a color transformation on the previous blocks before taking the transform of the previous blocks.

13. A device for determining a quantization parameter (QP) value, comprising:
   a memory configured to store: i) video data including a current block and a plurality of previous blocks, and ii) a plurality of defined techniques for calculating a QP adjustment value; and
   at least one processor circuit coupled to the memory and configured to:
      determine a complexity value of the previous blocks;
      determine a comparison of (a) the number of the previous blocks having a complexity value that is less than a lower complexity threshold to (b) the total number of the previous blocks;
      select a technique from the defined techniques for calculating a QP adjustment value for a current block based on the determined complexity value and the comparison;
      calculate the QP adjustment value for the current block via the selected technique; and
      determine the QP value for the current block based on the QP adjustment value.

14. The device of claim 13, wherein the processor circuit is further configured to:
   determine an average complexity value of the previous blocks;
   determine whether the average complexity value of the previous blocks is greater than or equal to an upper average complexity threshold; and
   select the technique based on the determination of whether the average complexity value of the previous blocks is greater than or equal to the upper average complexity threshold.

15. The device of claim 14, wherein the processor circuit is further configured to:
   determine a difference in the number of bits required to code the previous block and a target number of bits for the current block,
   wherein in response to i) the difference in the number of bits being greater than zero and ii) determining that the average complexity value of the previous blocks is greater than or equal to the upper average complexity threshold, the processor circuit is further configured to calculate the QP adjustment value via the selected technique to be greater than or equal to a QP adjustment value calculated via a default technique selected in response to i) the difference in the number of bits not being greater than zero or ii) determining that the average complexity value of the previous blocks is not greater than or equal to the upper average complexity threshold.

16. The device of claim 15, wherein for a negative or zero difference, the processor circuit is further configured to calculate an absolute value of the QP adjustment value to be less than or equal to an absolute value of a QP adjustment value calculated by a default technique.

17. The device of claim 13, wherein the processor circuit is further configured to:
   determine an average complexity value of the previous blocks;
   determine whether the average complexity value of the previous blocks is less than or equal to a lower average complexity threshold;
   determine whether the comparison is greater than or equal to a comparison threshold; and
   select the technique based on (i) the determination of whether the average complexity value of the previous blocks is less than or equal to the lower average complexity threshold, and (ii) the determination of whether the comparison is greater than or equal to the comparison threshold.

18. The device of claim 17, wherein the processor circuit is further configured to calculate an absolute value of the QP adjustment value via the selected technique to be less than or equal to an absolute value of a QP adjustment value calculated by a default technique for a given difference in the number of bits required to code the previous block and a target number of bits for the current block, wherein the default technique is selected in response to (i) the average complexity value of the previous blocks being greater than the lower average complexity threshold, or (ii) the comparison being less than the comparison threshold.

19. The device of claim 13, wherein the processor circuit is further configured to:
   select a technique for a current line; and
   calculate the QP adjustment value for each of the blocks in the current line via the selected technique for the current line.

20. The device of claim 19, wherein the selected technique for the current line is explicitly signaled in a bitstream.

21. An apparatus, comprising:
   means for determining a complexity value of a plurality of previous blocks;
   means for determining a comparison of (a) the number of the previous blocks having a complexity value that is less than a lower complexity threshold to (b) the total number of the previous blocks;
   means for selecting a technique from a plurality of defined techniques for calculating a QP adjustment value for a current block based on the determined complexity value and the comparison;
   means for calculating the QP adjustment value for the current block via the selected technique; and
   means for determining the QP value for the current block based on the QP adjustment value.

22. The apparatus of claim 21, further comprising:
   means for determining an average complexity value of the previous blocks;
   means for determining whether the average complexity value of the previous blocks is greater than or equal to an upper average complexity threshold, wherein means for selecting the technique further comprises means for selecting the technique based on the determination of whether the average complexity value of the previous blocks is greater than or equal to the upper average complexity threshold.

23. The apparatus of claim 22, further comprising:
means for determining a difference in the number of bits required to code the previous block and a target number of bits for the current block,
wherein in response to i) the difference in the number of bits being greater than zero and ii) determining that the average complexity value of the previous blocks is greater than or equal to the upper average complexity threshold, the QP adjustment value calculated via the selected technique is greater than or equal to a QP adjustment value calculated via a default technique selected in response to i) the difference in the number of bits not being greater than zero or ii) determining that the average complexity value of the previous blocks is not greater than or equal to the upper average complexity threshold.

24. The apparatus of claim 23, wherein for a negative or zero difference, an absolute value the QP adjustment value calculated by the selected technique is less than or equal to an absolute value a QP adjustment value calculated by a default technique.

25. The apparatus of claim 21, further comprising:
means for determining an average complexity value of the previous blocks;
means for determining whether the average complexity value of the previous blocks is less than or equal to a lower average complexity threshold; and
means for determining whether the comparison is greater than or equal to a comparison threshold,
wherein means for selecting the technique further comprise means for selecting the technique based on (i) the determination of whether the average complexity value of the previous blocks is less than or equal to the lower average complexity threshold, and (ii) the determination of whether the comparison is greater than or equal to the comparison threshold.

26. A non-transitory computer readable storage medium having stored thereon instructions that, when executed, cause a processor of a device to:
determine a complexity value of a plurality of previous blocks;
determine a ratio of (a) the number of the previous blocks having a complexity value that is less than a lower complexity threshold to (b) the total number of the previous blocks;
select a technique from a plurality of defined techniques for calculating a QP adjustment value for a current block based on the determined complexity value and the ratio;
calculate the QP adjustment value for the current block via the selected technique; and
determine the QP value for the current block based on the QP adjustment value.

27. The non-transitory computer readable storage medium of claim 26, further having stored thereon instructions that, when executed, cause the processor to:
determine an average complexity value of the previous blocks;
determine whether the average complexity value of the previous blocks is greater than or equal to an upper average complexity threshold,
wherein the selection of the technique is further based on the determination of whether the average complexity value of the previous blocks is greater than or equal to the upper average complexity threshold.

28. The non-transitory computer readable storage medium of claim 27, further having stored thereon instructions that, when executed, cause the processor to:
determine a difference in the number of bits required to code the previous block and a target number of bits for the current block,
wherein in response to i) the difference in the number of bits being greater than zero and ii) determining that the average complexity value of the previous blocks is greater than or equal to the upper average complexity threshold, the QP adjustment value calculated via the selected technique is greater than or equal to a QP adjustment value calculated via a default technique selected in response to i) the difference in the number of bits not being greater than zero or ii) determining that the average complexity value of the previous blocks is not greater than or equal to the upper average complexity threshold.

29. The non-transitory computer readable storage medium of claim 28, wherein for a negative or zero difference, an absolute value of the QP adjustment value calculated by the selected technique is less than or equal to an absolute value of a QP adjustment value calculated by a default technique.

30. The non-transitory computer readable storage medium of claim 26, further having stored thereon instructions that, when executed, cause the processor to:
determine an average complexity value of the previous blocks;
determine whether the average complexity value of the previous blocks is less than or equal to a lower average complexity threshold; and
determine whether the comparison is greater than or equal to a comparison threshold,
wherein the selecting of the technique is further based on (i) the determination of whether the average complexity value of the previous blocks is less than or equal to the lower average complexity threshold, and (ii) the determination of whether the comparison is greater than or equal to the comparison threshold.

* * * * *